United States Patent [19]

Minakuchi

[11] 4,203,061
[45] May 13, 1980

[54] ROTATIONAL SPEED INDICATING APPARATUS

[75] Inventor: Hiroshi Minakuchi, Kadoma, Japan

[73] Assignee: Matsushita Electric Industrial Co., Ltd., Japan

[21] Appl. No.: 890,911

[22] Filed: Mar. 28, 1978

[30] Foreign Application Priority Data

Mar. 30, 1977 [JP] Japan .................. 52-36524

[51] Int. Cl.² ............................................. H02P 7/28
[52] U.S. Cl. .................................. 318/490; 318/314; 318/318
[58] Field of Search ....................... 318/314, 318, 490; 324/161, 166, 164, 167, 172, 83 D, 175, 83 FE; 328/110, 155; 179/100.15; 358/128; 360/73; 340/658; 73/507; 274/9

[56] References Cited

U.S. PATENT DOCUMENTS

| | | | |
|---|---|---|---|
| 3,268,788 | 8/1966 | Branco | 318/314 |
| 3,296,039 | 12/1966 | MacDonald et al | 318/314 |
| 3,458,823 | 7/1969 | Nordahl | 328/110 |
| 3,982,190 | 9/1976 | Schaefer | 324/830 |

OTHER PUBLICATIONS

Connelly et al., "Phase-Locked Loop Includes Lock Indicator", *Electronics*, Sep. 5, 1974, pp. 112, 113.

*Primary Examiner*—David Smith, Jr.
*Attorney, Agent, or Firm*—Robert E. Burns; Emmanual J. Lobato; Bruce L. Adams

[57] ABSTRACT

In a motor-driving system, the motor speed is controlled by a feedback signal derived from the difference in frequency and phase between a manually adjustable variable frequency and a rotational speed indicating signal. Frequency deviation of the manually adjustable frequency from a standard frequency is detected to energize a visual indicating device to indicate the magnitude of the frequency deviation and hence the motor speed deviation from a setting level. The direction of the frequency deviation is detected to indicate whether the motor speed deviation is above or below the setting level. The variable frequency is manually adjusted to vary the motor speed by noting the visual indication until null indication is obtained.

15 Claims, 8 Drawing Figures

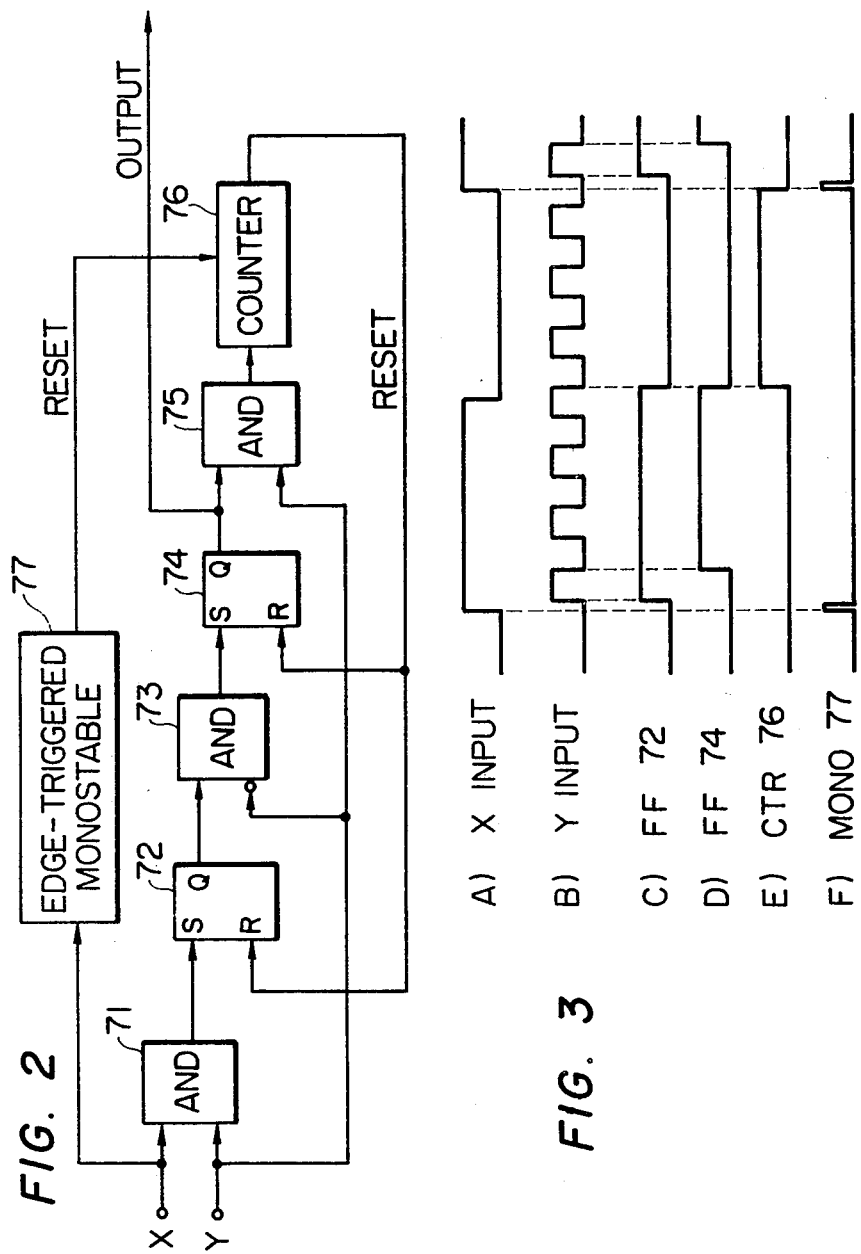

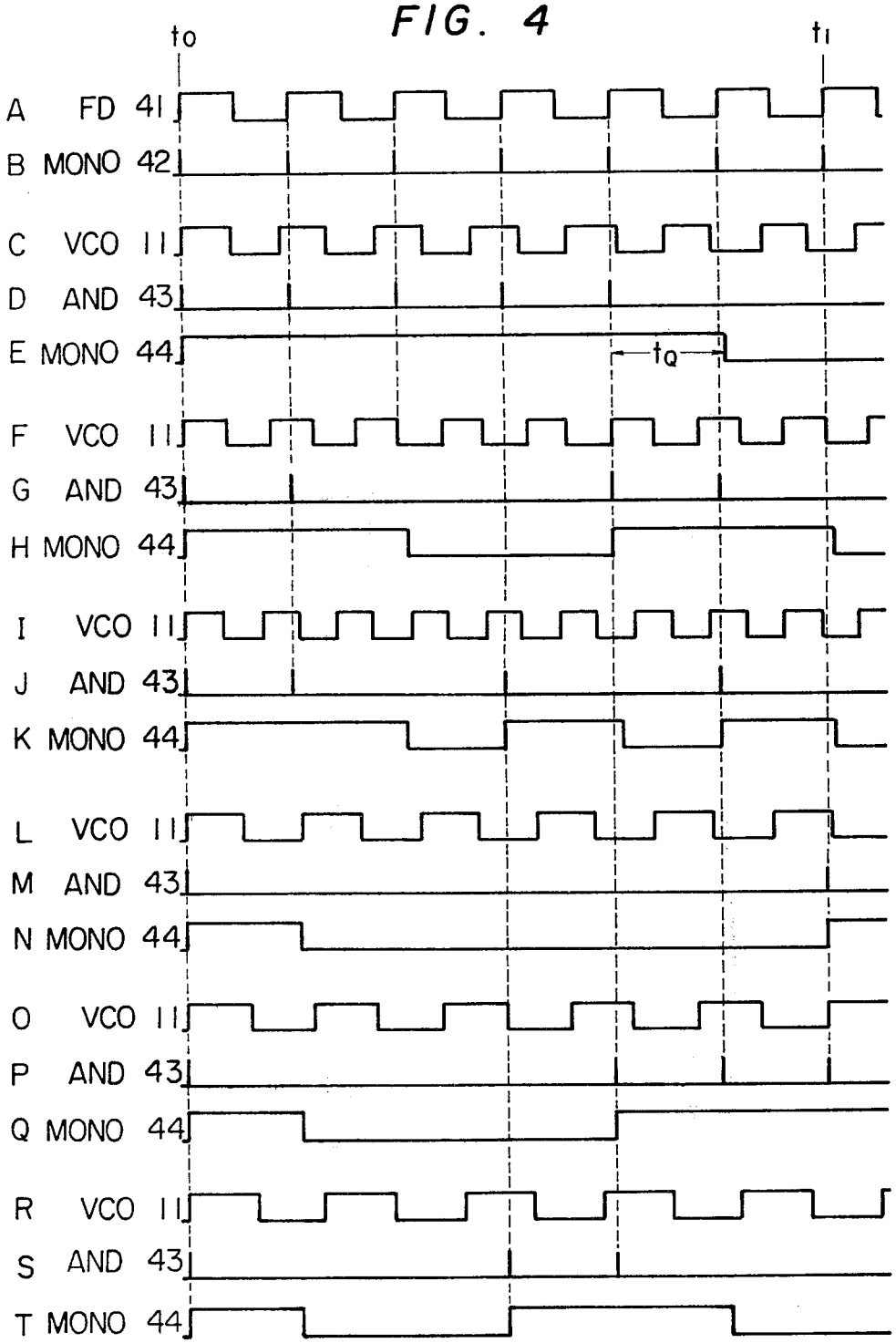

ROTATIONAL SPEED INDICATING APPARATUS

BACKGROUND OF THE INVENTION

The present invention relates generally to speed indicating systems and more particularly to apparatus for indicating the deviation of a motor from a standard speed. The present invention is particularly suitable for application to the drive mechanism of record playback systems.

In the conventional record players, stroboscopic methods are usually employed to indicate the deviation of turntable speed from a setting speed level. More specifically, the turntable is provided along its circumference with a number of concentric rings each containing a different number of dark and light segments. When the turntable is illuminated at a known frequency by a flashing discharge tube, speed can be determined by noting which pattern appears to be at a standstill or rotate slowly or fast. However, the conventional method is inappropriate for high-precision type record players where the speed deviation on the order of less than 1% is to be visually indicated. Furthermore, the stroboscopic pattern is blurred for a moment when the speed setting is changed until the turntable approaches the new setting level.

SUMMARY OF THE INVENTION

The primary object of the invention is to provide an electronic visual indicating apparatus for indicating the deviation of rotational speed from the setting level in discrete values.

Another object of the invention is to provide a speed indicating apparatus in which the deviation of the rotational speed is visually indicated by a signal representative of the difference between a manually variable frequency and a standard frequency and the rotational speed is related to the variable frequency so that the speed setting does not affect the visual indication.

The apparatus of the invention comprises a frequency deviation detector which detects the frequency deviation of a manually adjustable frequency from a standard frequency, a deviation direction detector which detects whether the variable frequency is above or below the standard frequency and a visually indicating device for indicating the detected frequency deviation in discrete representation in one of two visual states in response to the detected direction of frequency deviation. A motor control circuit generates a first signal representative of the difference in frequency between the variable frequency signal and a rotation representative signal until the two frequencies come close to each other and generates a second signal representative of the difference in phase between the two signals. A speed setting means is provided to change the frequency of the variable frequency signal so that the first signal is generated in response to a change in speed setting to drive the motor until it approaches the setting level, whereupon the phase-difference signal is generated to precisely control the motor speed until the setting speed is reached. The variable frequency is manually adjusted by noting the visual indication until null indication is obtained. Since the visual indicator is dependent on the variable frequency signal and not dependent on the rotational speed, indication is not affected by a change in speed setting.

BRIEF DESCRIPTION OF THE DRAWINGS

These and other objects, features and advantages of the invention will become understood when read in conjunction with the accompanying drawings, in which:

FIG. 2 is an illustration of details of a monostable circuit shown in FIG. 1;

FIG. 3 is a timing diagram useful for understanding the operation of FIG. 2;

FIG. 4 is a timing diagram useful for understanding the operation of a frequency deviation detector of FIG. 1;

DETAILED DESCRIPTION

Figure 1:
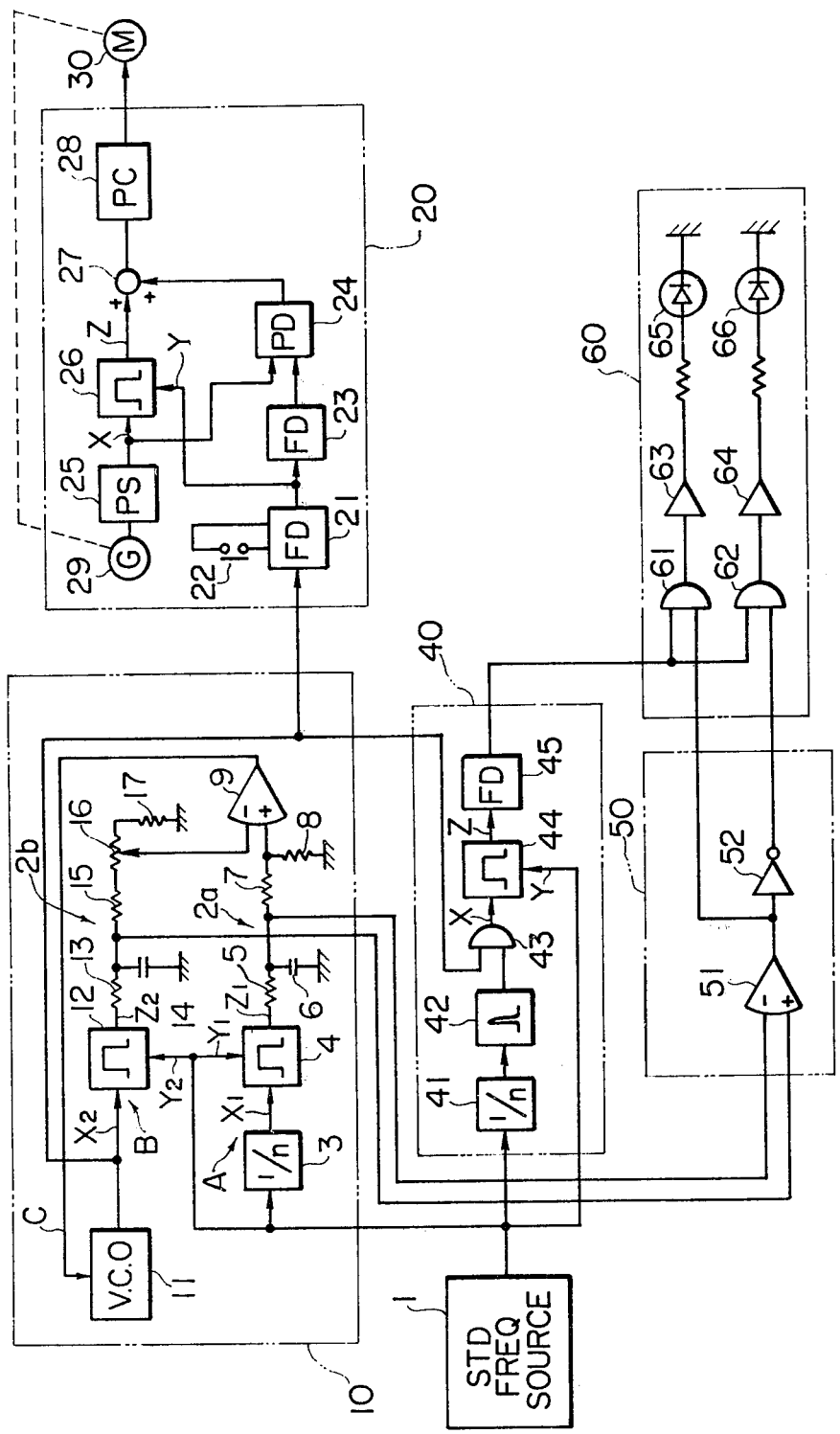
FIG. 1 is an illustration of a circuit diagram of a preferred embodiment of the invention.

Referring now to FIG. 1, a preferred embodiment of the present invention is shown as comprising a standard frequency source 1 such as a crystal-controlled oscillator, a variable frequency oscillator 10, a speed control circuit 20 for controlling the speed of a motor 30 which drives, for example, a turntable of an audio-video disk playback system, a frequency deviation detector 40, a comparator 50 and an error indicator 60. The variable frequency oscillator 10 provides an output signal at a frequency which is manually adjustable to a level above and below the standard frequency provided by the standard frequency source 1 and feeds its output to the speed control circuit 20 and also to the frequency deviation detector 40. The speed control circuit 20 provides closed-loop motor speed control based on the signal supplied from the variable frequency oscillator 10 at one of two speed levels. The frequency deviation detector 40 is also connected to receive the standard frequency signal from source 1 to generate electrical pulses at intervals depending on the deviation of the frequency of the output from the oscillator 10 from the standard frequency and applies them to the error indicator 60. The comparator 50 receives its input signals from the variable frequency oscillator 10 to determine whether the frequency of the oscillator 10 is above or below the standard frequency. The indicator 60 is to visually indicate the presence of the pulses supplied from the frequency deviation detector 40 in one of two visual states depending on the output from the comparator 50.

The variable frequency oscillator 10 comprises a first channel A, a second channel B and a feedback channel C. The first channel A is connected between a standard frequency source 1 or crystal-controlled oscillator and the positive input of a comparator 9 and the second channel B is connected between a varible frequency source 11 or voltage-controlled oscillator and the negative input of the comparator 9. The feedback channel is formed by a connection between the output of comparator 9 and the frequency control input of the variable frequency oscillator 11. The first channel A includes, in this illustration, a frequency divider or scaler 3 and a monostable circuit 4. The frequency scaler 3 provides an output at a frequency 1/n of the standard frequency to an $X_1$ input of the monostable circuit 4. The latter also receives another input signal at input $Y_1$ from the standard frequency source 1. The function of the monostable circuit 4 is to produce a pulse of a constant duration, which is determined by the constant frequency of the source 1, in response to each cycle or oscillation of the frequency scaler 3. The first channel A further includes a filter circuit 2a connected to an output $Z_1$ of the monostable circuit 4 to produce a voltage signal representing the total duration of the pulses delivered within a given period of time. The filter circuit 2a includes a voltage divider formed by a set of resistors 5, 6 and 8 connected in series between output $Z_1$ and ground, and a capacitor 6 connected between the junction of resistors 5, 7 and ground, the junction between resistors 7 and 8 being connected to the positive terminal of comparator 9.

The second channel B comprises a monostable circuit 12 which is preferably of the same construction as circuit 4 and connected to be responsive to a first input from the variable frequency oscillator 11 on input $X_2$ and a second input from the standard frequency source 1 on input $Y_2$. Similarly, the monostable circuit 12 provides a pulse of a constant duration, which is determined by the standard frequency, in response to each cycle or oscillation of the variable frequency oscillator 11. A filter circuit 26 is connected in the channel B, which includes a voltage divider formed by resistors 13, 15, 16 and 17 connected in series between output $Z_2$ of the monostable 12 and ground, and a capacitor 14 connected between the junction of resistors 13, 15 and ground. Resistor 16 is a variable resistance and the voltage applied to the negative input of comparator 9 is taken from the wiper terminal of the variable resistor 16.

Now, the values of resistors 5, 7, 8, 13, 15, 16 and 17 are denoted by $R_5$, $R_7$, $R_8$, $R_{13}$, $R_{15}$, $R_{16}$ and $R_{17}$, respectively. Assuming that the pulse amplitudes of the monostable circuits 4 and 12 are equal to each other, voltages $V_6$ and $V_{14}$ developed across capacitors 6 and 14 will respectively be given as follows:

$$V_6 = \frac{(R_7 + R_8)T_{H1} \cdot V_{cc}}{(R_5 + R_7 + R_8)(T_{H1} + T_{L1})} \quad (1)$$

$$V_{14} = \frac{(R_{15} + R_{16} + R_{17})T_{H2} \cdot V_{cc}}{(R_{13} + R_{15} + R_{16} + R_{17})(T_{H2} + T_{L2})} \quad (2)$$

where, $T_{H1}$ and $T_{L1}$ are the active and inactive periods, respectively, of the pulse sequence from monostable circuit 4, $T_{H2}$ and $T_{L2}$ are the active and inactive periods, respectively, of the pulse sequence from monostable circuit 12, and $V_{cc}$ is the supply voltage. Assume that $R_5 = R_{13}$ and $R_7 + R_8 = R_{15} + R_{16} + R_{17}$. Since $T_{H1} = T_{H2} = T_H$ the following Equation holds, $$\frac{R_7 + R_8}{R_5 + R_7 + R_8} \cdot V_{cc} = \frac{R_{15} + R_{16} + R_{17}}{R_{13} + R_{15} + R_{16} + R_{17}} \cdot V_{cc} = V_k \quad (3)$$

Equations (1) and (2) can be rewritten as follows:

$$V_6 = \frac{T_H}{T_H + T_{L1}} \cdot V_k \quad (4)$$

$$V_{14} = \frac{T_H}{T_H + T_{L2}} \cdot V_k \quad (5)$$

Since the input impedance of the positive and negative inputs of comparator 9 can be considered as having an infinite value, the voltages $V_p$ and $V_n$ at the positive and negative inputs, respectively, of the comparator 9 are given as follows:

$$V_p = \frac{R_8 R_6}{R_7 + R_8} \quad (6)$$

$$V_p = \frac{V_6}{2} = \frac{V_K \cdot T_H}{2(T_H + T_{K1})} \quad (7)$$

$$V_n = \frac{V_{14}}{1 + R_I/R_{II}} = \frac{T_H \cdot V_k}{(1 + R_I/R_{II})(T_H + T_{L2})} \quad (8)$$

where, $R_I$ is a combined value of resistor $R_{15}$ and the partial resistance of resistor $R_{16}$ measured from its left end to which resistor $R_{15}$ is connected to the wiper terminal, and $R_{II}$ is a combined value of resistor $R_{17}$ and the remainder of resistor $R_{16}$. The frequency $f_s$ of the signal delivered from the frequency scaler 3 and the frequency $f_v$ of the variable frequency oscillator 11 are respectively given as follows:

$$f_s = \frac{1}{T_H + T_{L1}} \quad (9)$$

$$f_v = \frac{1}{T_H + T_{L2}} \quad (10)$$

The comparator 9 delivers a control signal which corresponds to the difference between the input voltages $V_p$ and $V_n$, so that feedback operation will be continued until the comparator output decreases to zero. Under this equilibrium condition, the input two voltages are equal to each other.

By equating Equations (7) and (8) and substituting Equations (9) and (10), frequencies $f_s$ and $f_v$ have the following relation:

$$f_v = [\frac{R_I}{2R_{II}} + 1] \cdot f_s \quad (11)$$

Therefore, it is seen that the output frequency of the variable frequency oscillator 11 can be determined by the voltage dividing ratio of the variable resistor 16 and by the standard frequency. Since the standard frequency is constant, adjustment of variable resistor 16 permits continual variation of the output frequency to a desired value. From a practical standpoint, however, the same type of resistance should preferably be employed for resistors 15 and 17 to minimize the effect of resistance variations as a function of aging and temperature, although a different resistance type may be used for the variable resistor 16, since the voltage at the terminal point of the latter is not subject to vary as a function of such factors. Furthermore, to minimize the voltage variations across the capacitor 14 as a function of the resistance variations, the resistance $R_{13}$ should preferably be much smaller than the combined resistance of $R_{15}$, $R_{16}$ and $R_{17}$, and the resistance $R_{16}$ should also be sufficiently smaller than the combined resistance of $R_{15}$ and $R_{17}$. Similarly, the resistance $R_5$ is preferably much smaller than the combined value of $R_7$ and $R_8$.

FIG. 2 illustrates a preferred embodiment of each of the monostable circuits 4 and 12. An AND gate 71 is provided to be responsive to the simultaneous occurrences of the oscillations, or pulsations of the signals at the X and Y input terminals of the monostable circuit (FIGS. 3A and 3B) to provide a logic "1" output to a first flip-flop 72 to turn it to a logic "1" state (FIG. 3C) which in turn enables an AND gate 73. A second flip-flop 74 is shown connected to the output of AND gate 73 which triggers flip-flop 74 to a logic "1" state in response to a change in the logic level of the signal on Y input to "0" (FIG. 3D) in the presence of the logic "1" state of flip-flop 72. With the flip-flop 74 being at logic "1" state, the pulses on input terminal Y are supplied through AND gate 75 to a three-bit binary counter 76. At a pulse count of three, the counter 76 produces an output (FIG. 3E) which is transmitted to the reset inputs of flip-flops 72 and 74 to allow them to return to the "0" logic state. The output of the counter 76 remains at the logic "1" state until it is reset in response to the leading edge of the next pulse on terminal X by means of an edge-triggered monostable multivibrator 77 connected to the X input terminal (FIG. 3). The output of the monostable circuit is derived from the flip-flop 74. It will be seen that the active period, or pulse duration, of the output pulse sequence is determined by the frequency of the signal on input terminal Y, that is, the standard frequency and the pulse repetition frequency is determined by the frequency of the signal on input terminal $X_1$ or $X_2$. Therefore, the average energy of the output pulses is proportional to the frequency at the X input terminal and inversely proportional to the frequency at the Y input terminal.

Since the duration of each pulse derived from the monostable circuit 12 corresponds to the total duration or pulse energy of three input cycles or pulsations on terminal $Y_2$, it is seen that the dividing factor n of the frequency scaler 3 should be an integer equal to or greater than twice the number of input pulses from terminal $Y_2$ for each of the monostable output pulses, that is, in this example, six.

Referring again to FIG. 1, the speed control circuit 20 is shown comprising a variable frequency divider 21 which provides frequency division of the output from the variable frequency oscillator 10 at one of two ratios in dependence on the open or closure state of a speed control switch 22. The output from the variable frequency divider 21 is applied via a second frequency divider 23 to one input of a phase detector 24. A generator 29 is mechanically linked wish the motor 30 for rotation therewith to provide an electrical signal representative of the speed of rotation of the motor 30 and supplies its output to a pulse shaper 25. The output from the pulse shaper 25 is coupled on the one hand to the X input of a monostable circuit 26 of identical construction to that described previously, and on the other hand to another input of the phase detector 24. The monostable circuit 26 receives its Y control signal from the output of variable frequency divider 21 and feeds its output signal on terminal Z to a summing junction 27, and thence to a power control circuit 28. The output of the phase detector 24 is also coupled to the power control circuit 28 via the summation circuit 27.

The operation of the speed control circuit 20 is as follows: Assume that the switch 22 is closed so that the frequency divider 21 is set at a low frequency division ratio to generate a high frequency output. At this moment, since there is a large frequency difference between the two inputs, the phase detector 24 provides no significant output signal. On the other hand, the increase in frequency at the Y input of monostable circuit 26 results in a pulse of smaller duration so that the pulse energy generated per unit time from the monostable circuit 26 is reduced. In response to the reduction of pulse energy, the power control circuit 28 accelerates the motor 30, which is turn raises the frequency of the output from the pulse shaper 25. As the frequency of the input to the X input terminal of monostable 26 increases, the output frequency of the monostable 26 and hence the average pulse energy increases, which causes the power control circuit 28 to reduce its motor drive energy until the frequency of the pulse shaper 25 approaches the frequency of the variable frequency divider 21. As the two inputs to the phase detector 24 approach in frequency, the phase detector starts generating its output which energizes the power controller 28 to precisely control the motor speed until the its input signals are brought into phase. It is therefore noted that the monostable circuit 26 provides a coarse speed control with which the motor speed is quickly brought into the setting speed and the phase detector 24 provides a fine speed control when the motor approaches the setting speed.

When it is desired to change the motor speed to a lower level, the switch 22 is opened. The monostable circuit 26 will increase its average output energy which in turn decelerates the motor 30 until its X input signal approaches the low frequency standard set by frequency divider 21, whereupon the phase detector 24 takes the place of motor speed control. Since the input to the speed control circuit 20 is supplied from the variable frequency oscillator 10, the motor speed is also variable in dependence on the manual adjustment of the variable resistor 16 of the variable frequency oscillator in a manner as will be described later.

The frequency deviation detector 40 includes a frequency divider 41 having a division ratio of 1/n connected to the standard frequency source 1 and a monostable multivibrator of conventional design which is connected to the frequency divider 41 to generate a short duration trigger pulse in response to the leading edge of the input pulse from the frequency divider 41 and applies it to an AND gate 43 and thence to the X input of a monostable circuit 44 of the similar construction to those described above. The AND gate 43 receives another input signal from the output of variable frequency oscillator 10 to pass the trigger pulse to the monostable circuit 44 in the presence of a pulse from the variable frequency oscillator 10. Since the trigger pulses occur at the same repetition frequency as that applied to the $X_1$ input of the monostable circuit 4 of the variable frequency oscillator 10, the number of trigger pulses passed through AND gate 43 varies with the difference in frequency between the two inputs to the AND gate 43. The monostable circuit 44 is designed to have an active time longer than the period of the variable frequency oscillator 10. For example, if the frequency divides 3 and 41 have a frequency division ratio of 1/14, the monostable circuit 44 is designed to count 15 pulses applied to its Y input terminal from the standard frequency source 1 so that its output pulse initiates at the start of the 15-pulse train and terminates at the end of the pulse train. The output of the monostable circuit 44 is coupled to a frequency divider 45 to reduce the repetition rate of the monostable 44 output to a level which is visually discernible.

The comparator 50 includes an operational amplifier 51 having its inverting and noninverting input terminals respectively connected to the junction of resistors 5 and 7 and to the junction of resistors 13 and 15 of the variable frequency oscillator. When the manually adjusted frequency is higher than the standard frequency, a high voltage level output will be delivered, or a low voltage level output when the situation is reverse. To provide complementary output signals, an inverting amplifier 52 is connected to the comparator operational amplifier 51. The error indicator 60 includes AND gates 61 and 62 which receive the complementary outputs from the comparator 50 so that one of them is enabled to pass the output from the frequency deviation detector 40 therethrough. The output of the AND gate 61 is coupled through an amplifier 63 to a high-speed indicating light-emitting diode 65 to energize it when the variable frequency is higher than the standard frequency, and the output of the AND gate 62 is coupled through amplifier 64 to a low-speed indicating light-emitting diode 66 to energize it when the variable frequency is lower than the standard frequency.

The operation of the frequency deviation detector 40 in connection with the comparator 50 and indicator 60 will be more clearly understood with reference to the waveforms illustrated in FIGS. 4A to 4T. FIG. 4A depicts the waveform of the output of frequency divider 41 which is identical to the waveform of the input to X terminal of monostable circuit 4, and FIG. 4B illustrates the pulses generated from the monostable multivibrator 42. Assume that the variable resistor 16 is adjusted so that the frequency of VCO 11 and thus the frequency of the variable frequency oscillator 10 rises slightly above the frequency of the divider 41 as illustrated in FIG. 4C. The output from the AND gate 43 will pass only five input pulses from the monostable 42 so that monostable circuit 44 is switched to a high output state in response to the initial trigger pulse and then switches to the low output state in response to the elapse of its active time "$t_Q$" after the occurrence of the fifth trigger pulse so that only one pulse exists during a time period from $t_0$ to $t_1$ (FIG. 4E). A further adjustment of the variable resistor 16 in the same direction will reduce the variable frequency further as shown in FIG. 4F and as a result two pulses will occur at the output of the monostable 44 (FIGS. 4G and 4H). By examination of FIGS. 4I, 4J and 4K it will be observed that three pulses will be generated by the monostable 44 if the variable resistor 16 is further adjusted in the frequency-rising direction. On the other hand, if the resistor 16 is adjusted in the opposite direction so that the VCO frequency is lowered slightly below the standard frequency as seen in FIG. 4L, only one trigger pulse, and hence a single output pulse is provided by the monostable circuit 44 during the interval $t_0$ to $t_1$ (FIGS. 4M and 4N). A further adjustment of resistor 16 in the same direction increases the number of pulses generated as is seen from FIGS. 4O to 4T.

The output of the monostable circuit 44 occurs at a rate depending on the deviation of the manually adjusted frequency from the standard frequency, although the duration of each output pulse varies with the deviation as long as the two frequencies are very close to each other. Assume that the output frequency of the frequency divider 41 is set at 100 kHz and if the variable frequency is 101 kHz, that is the motor speed is 1% higher than the setting value, the output frequency of the monostable 44 is 1 kHz. This frequency is divided by the frequency divider 45 down to 1 Hz, for example. The comparator operational amplifier 51 provides a high level output so that AND gate 61 is enabled to pass the 1 Hz output from the frequency deviation detector 40 to the amplifer 63 so that LED 65 is caused to blink at a rate of 1 Hz. When the motor speed is 1% lower than the setting level, the comparator 50 enables AND gate 62 to blink the LED 66 at a rate of 1 Hz. With an increase in frequency deviation, the blinking rate correspondingly increases. Thus, the magnitude of the frequency deviation and hence the deviation of motor speed is calculated by counting the number of blinks per second or measuring the interval between successive blinks. For instance, if the interval between successive blinks as indicated by LED 65 is 10 seconds, the motor 30 is run at a speed 0.1% higher than the setting speed. It will be appreciated therefore that the variable resistor 16 of the variable frequency oscillator 10 is manually adjusted so that zero indication is obtained.

Since the blinking rate is only determined by the deviation frequency which is adjusted by the variable resistor 16, the visual indication is not disturbed even when the speed setting level is changed by switch 22. Whereas, in the prior art stroboscopic method, the stroboscopic pattern is blurred when the motor speed rapidly varies in response to a change in speed setting level.

Figure 5:
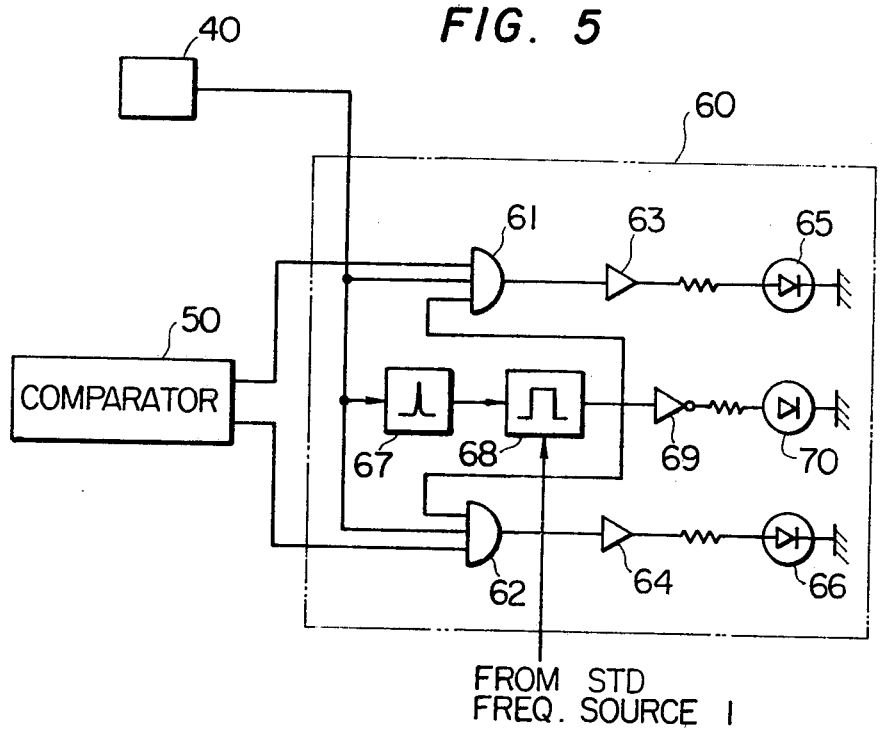
FIG. 5 is a modification of the embodiment of FIG. 1.

FIG. 5 is an illustration of a preferred embodiment of the error indicator 60 in which the same numerals are used to identify the same parts as those shown in FIG. 1. The indicator 60 further includes a monostable multivibrator 67 shown connected to the output of the deviation detector 40 to detect the leading edge of the input signal to trigger a monostable circuit 68 through its X input terminal, the Y input of which is connected to the standard frequency source 1. The monostable circuit 68 of this embodiment has a longer pulse duration than that of the monostable circuit 44 of the frequency deviation detector 40. The output of the monostable circuit 68 is connected through an inverting amplifier 69 to a light-emitting diode 70, and also to AND gates 61 and 62.

In operation, when the deviation frequency is other than zero, the monostable circuit 68 is triggered by the monostable 67 in response to an output of the deviation detector 40 and switched to an active state or high voltage state, which state is inverted by the inverter 69 so that light-emitting diode 70 remains de-energized, while enabling AND gates 61 and 62 to allow one of the LEDs 65 and 66 to be energized in response to the output of deviation detector 40 in a manner identical to that described above. When the deviation frequency becomes zero, the voltage at the output of the deviation detector 40 remains at one of high and low levels depending on the phase difference between the two frequencies so that the monostable circuit 68 is switched to the stable state or low-voltage state after the elapse of its active period from the time of coincidence between the two frequencies. Therefore, AND gates 61 and 62 are disabled and LED 70 is energized to indicate that the motor speed is matched to the standard setting speed.

Figure 6:
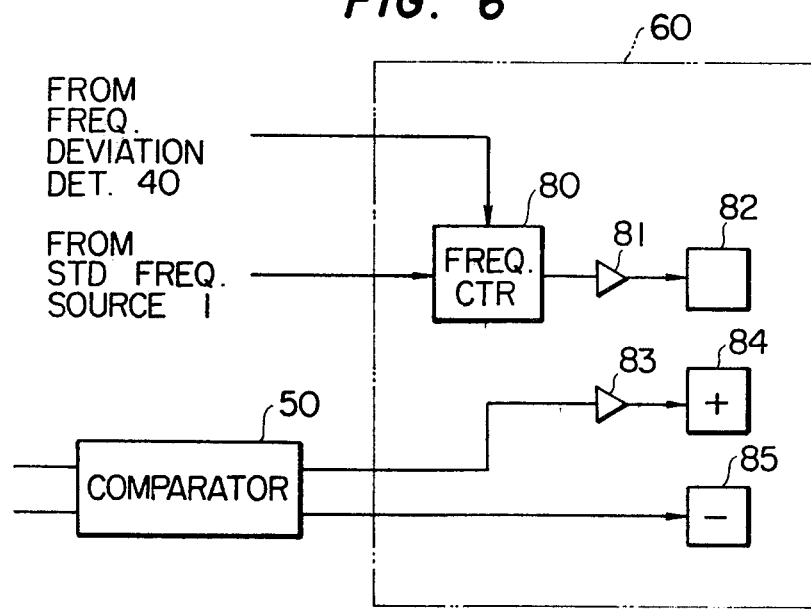
FIG. 6 is a further modification of the embodiment of FIG. 1.

A modification of the indicator 60 of FIG. 1 is illustrated in FIG. 6 in which a frequency counter 80 is provided to count the pulses generated by the standard frequency source 1 in the presence of an output from the frequency deviation detector 40. Through an amplifier 81 the frequency counter 80 drives a numeral or digit indicator 82 known as Nixie, a trademark of Burroughs Corporation. The number of pulses counted by the counter 80 represents the duration of each output pulse from the frequency deviation detector 40 so that the number indicated by the numeral indicator 82 is a representation of the deviation of the motor speed from the setting level. The complementary outputs of the comparator 50 are connected through amplifier 83 to a "plus" sign indicator 84 to energize it when the motor speed is higher than the setting speed and also to a "minus" sign indicator 85 which is energized when the motor speed is lower than the setting speed.

Figure 7:
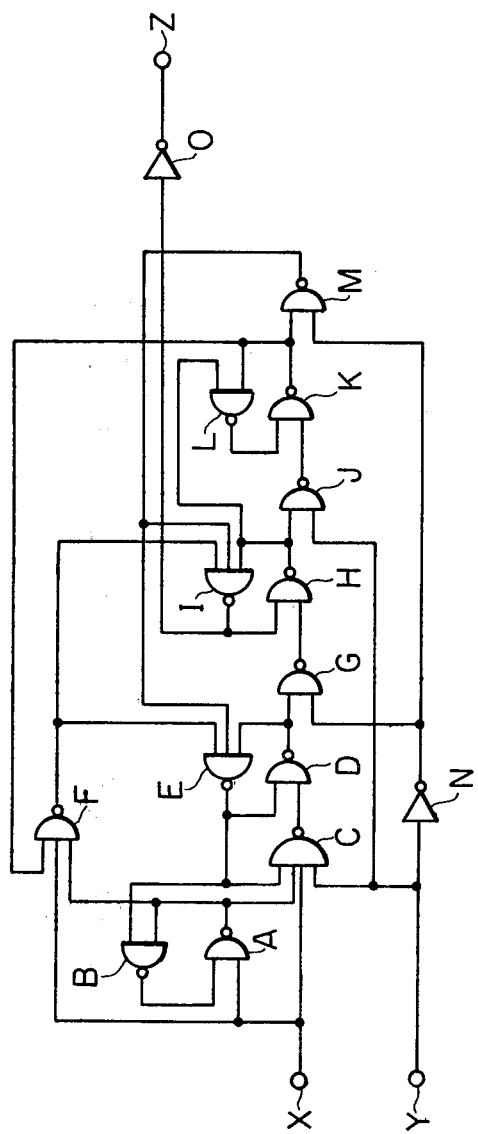
FIG. 7 is an illustration of a practical embodiment of the monostable circuit of FIG. 2.
Figure 8:
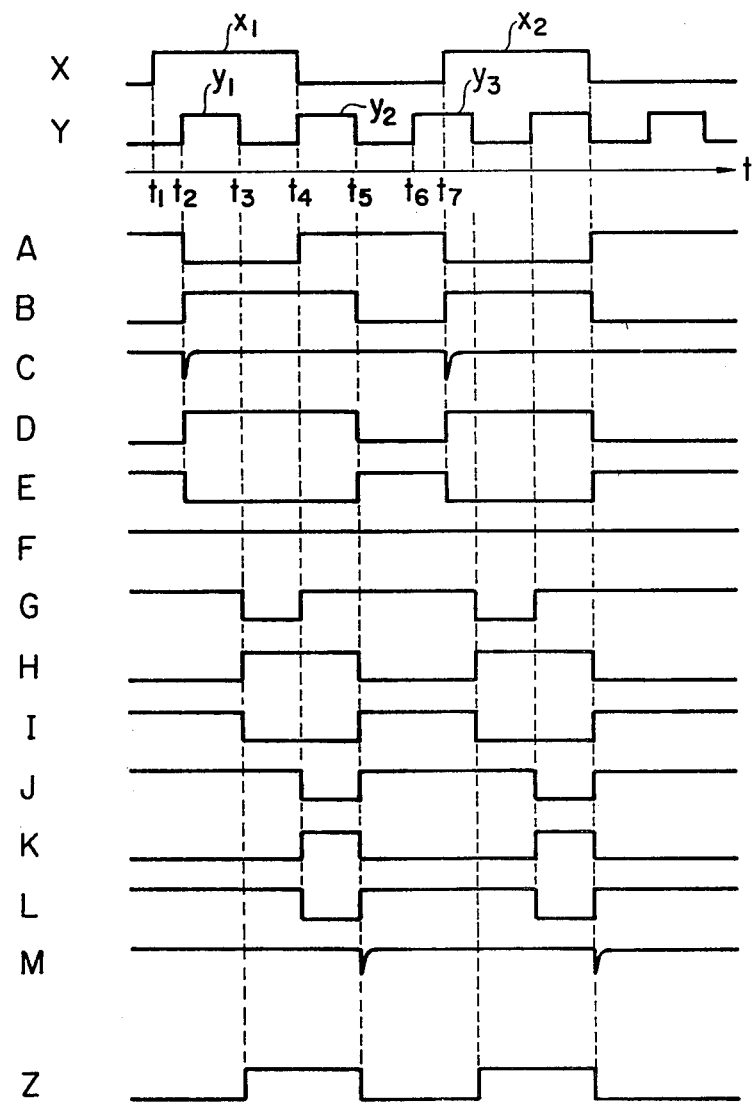
FIG. 8 is a timing diagram useful for understanding the operation of the monostable circuit of FIG. 7.

FIG. 7 is an illustration of a practical embodiment of the monostable circuit as described in connection with FIG. 2. The monostable circuit comprises a number of NAND gates A to M and NOT circuits N and O. NAND gates C, D and E and NOT circuit N constitute a first flip-flop circuit which corresponds to the flip-flop 72 of FIG. 2 and NAND gates G, H and I constitute a second flip-flop circuit which corresponds to the flip-flop 74 of FIG. 2. NAND gates J, K and L constitute a binary counter, in this embodiment a one bit counter, which corresponds to the counter 30 of FIG. 2. The description of FIG. 7 will now proceed with reference to a series of waveforms shown in FIG. 8 in which the characters on the left side of each waveform corresponds to the circuit elements in FIG. 7. Before application of a pulse "x1" on terminal X at time $t_1$, NAND gates E and I have been in receipt on a "0" logic reset pulse from NAND gate M to reset the first and second flip-flops to the original high or "1" logic state which has been coupled to NAND gates B, C, D and H. Because of the nature of the NAND gate which is in a "1" logic state in the presence of a "0" logic input at any one of its input terminals and switches to a "0" logic state in response to the simultaneous presence of "1" logic states to all of the input terminals, NAND gate A has been in a "1" logic state until a pulse "y1" on terminal Y coincides with pulses $X_1$ at time $t_2$. The "1" logic from NAND gate A has been coupled to the input terminal 2c of NAND gate C so that upon application of the "x1" pulse to terminal X causes it to place of "0" logic on terminal Oc which is coupled to terminal 2d of NAND gate D to turn it to a "1" logic state which is in turn coupled to NAND gate E to turn it to a "0" logic state. Thus, NAND gates B, A and C successively change their binary states to "1," "0" and "1," respectively. At time $t_3$, the logic state of the pulse sequence on terminal Y changes to "0" which is inverted by NOT circuit N and coupled to NAND gate G. Since NAND gate D has been in a "1" logic state, NAND gate D changes its state to logic "0" resulting in a "1" logic state in NAND gate H, which in turn causes NAND gate I to turn to "0" output state. At time $t_4$, the logic state of terminal X changes to "0" logic output from NAND gate A. Simultaneously with this, the logic state of terminal Y changes to "1" upon application of pulse "y2" whose inverted "0" is coupled to NAND gate G to turn it to logic "1," and at the same time NAND gate J turns to "0" which in turn switches NAND gate K to "1" resulting in a "0" state at the output of NAND gate L.

At time $t_5$, the logic state of terminal Y changes to "0" which simultaneously turn NAND gates J and M to logic state "1" and "0," respectively. The "0" logic of NAND gates M is the reset pulse which is coupled to NAND gates E and I, to turn time to logic "1." NAND gate H is subsequently turned to logic "0" in response to the "1" state of NAND gate I. The "0" logic of NAND gate H is coupled to NAND gate L to turn it to logic "1" which results in NAND gate K turning to logic "0" state, thus terminating the "0" logic state of NAND gate M. On the other hand, the "1" logic state of NAND gate E causes NAND gates B and D to turn to the "0" state.

Logic state "1" at time $t_6$ on terminal Y due to the occurrence of pulse "y3" produces no subsequent change in logic states of the monostable circuit until time $t_7$ when pulse "x2" appears at terminal X, whereupon there occurs a series of similar events to those that occurred at time $t_2$. It will be understood that a series of logic changes which have occurred will be repeated in response to subsequent changes in logic state of the input terminals X and Y. The output pulse of the monostable circuit is available from output terminal Z connected to the output of NAND gate I through NOT circuit O. It will be seen from FIG. 8 that the duration of each output pulse from terminal Z corresponds to one cycle of the pulse sequence on terminal Y and that each output pulse occurs within each cycle of the input pulse on terminal X, and therefore the repetition rate is dependent upon the signal on terminal X.

When the signal on terminal X changes from "0" to "1" logic states during the time when NAND gate K is in the "1" logic state which would likely to occur when the frequency of signal on terminal X is increased to such an extent that it approaches the standard frequency. Under such circumstances, NAND gate M becomes irrespective to such logic states and therefore no reset pulse is provided therefrom. It is NAND gate F that is brought into play in this situation to function as a resetting circuit instead of NAND gate M.

What is claimed is:

1. Apparatus for visually indicating the deviation of the speed of a motor from a standard setting speed, comprising:
   a variable frequency standard phase signal source for generating a standard phase signal at a manually selectable continuously variable frequency and driving said motor at variable speeds;
   a standard frequency signal source;
   means for generating a speed related signal at a frequency related to the speed of rotation of said motor;
   a phase comparator for detecting a phase difference between said standard phase signal and said speed related signal for correcting the speed of said motor in accordance with the detected phase difference to reduce said phase difference substantially to zero;
   a mixing circuit connected to said variable frequency and standard frequency signal sources for generating a beat frequency signal; and
   visual indicating means responsive to said beat frequency signal for visually indicating said beat frequency.

2. Apparatus as claimed in claim 1, wherein said visual indicating means comprises a first and a second light-emitting elements and means for allowing said first or second light-emitting elements to respond to the output of said mixing circuit when the frequency of said variable frequency source is higher or lower than the frequency of said standard frequency source, respectively.

3. Apparatus as claimed in claim 1, further comprising means for measuring the time period of a signal from said mixing circuit and indicating the measured time period of said signal in numerical representation.

4. Apparatus as claimed in claim 1, further comprising a frequency divider connected to the output of said variable frequency standard phase signal source for providing one of a plurality of manually selectable different frequency standard phase signals for application to said phase comparator.

5. Apparatus as claimed in claim 4, further comprising a monostable device connected to said speed related signal generating means for generating a monostable pulse in response to each oscillation of said speed related signal and connected to said variable frequency standard phase signal source to vary the duration of said monostable pulse as a function of the period of said variable frequency standard phase signal, and means to apply said monostable pulse to said motor.

6. Apparatus as claimed in claim 5, wherein said monostable device comprises:

first bistable means for assuming a first binary state in response to the simultaneous presence of oscillations of said speed related signal and said variable frequency standard phase signal;

second bistable means for assuming a first binary state, in the presence of the first binary state of said first bistable means, in response to the absence of the oscillation of said standard frequency signal; and counter means for developing a reset signal for resetting said first and second bistable means to a second binary state in response to a count of oscillations of said standard frequency signal generated in the presence of said first binary state of said second bistable means, said first binary state of said second bistable means corresponding to said monostable pulse.

7. Apparatus as claimed in claim 1, wherein said variable frequency standard phase signal source comprises:

a frequency divider connected to said standard frequency signal source;

a first monostable device having a first input terminal connected to the output of said frequency divider and a second input terminal connected to said standard frequency signal source for generating a first monostable pulse in response to each oscillation of the output signal from said frequency divider with a duration variable as a function of the period of said standard frequency signal;

a variable frequency oscillator;

a second monostable device having a first input terminal connected to the output of said variable frequency oscillator and a second input terminal connected to said standard frequency signal source for generating a second monostable pulse in response to each oscillation of the output signal from said variable frequency oscillator with a duration variable as a function of the period of said standard frequency signal;

a differential integrator connected to be responsive to said first and second monostable pulses for generating a voltage signal representative of the difference in duty cycle between said first and second monostable pulses for application to the input of said variable frequency oscillator; and a variable resistance element connected to said differential integrator, having a manually adjustable, continuously variable resistance for varying said voltage signal, whereby the output signal of said variable frequency oscillator is continuously variable in frequency as a function of the resistance of said variable resistance element.

8. Apparatus as claimed in claim 7, wherein said first monostable device, comprises:

first bistable means for assuming a first binary state in response to the simultaneous presence of oscillations of said standard frequency signal and said output signal of said frequency divider;

second bistable means for assuming a first binary state, in the presence of the first binary state of said first bistable means, in response to the absence of the oscillation of said standard frequency signal; and first counter means for developing a reset signal for resetting said first and second bistable means to a second binary state in response to a count of oscillations of said standard frequency signal generated in the presence of said first binary state of said second bistable means, said first binary state of said second bistable means corresponding to said first monostable pulse;

wherein said second monostable device comprises:

third bistable means for assuming a first binary state in response to the simultaneous presence of said reference frequency signal and to the output signal from said variable frequency oscillator;

fourth bistable means for assuming a first binary state, in the presence of the first binary state of said third bistable means, in response to the absence of the oscillation of said standard frequency signal; and second counter means for developing a reset signal for resetting said third and fourth bistable means to a second binary state in response to a count of oscillations of said standard frequency signal generated in the presence of said first binary state of said fourth bistable means, said first binary state of said fourth bistable means corresponding to said second monostable pulse.

9. Apparatus as claimed in claim 7, wherein said differential integrator comprises:

a first smoothing circuit connected to the output of said first monostable device for generating a first voltage signal having a voltage level proportional to the duty cycle of said first pulses;

a second smoothing circuit connected to the output of said second monostable device for generating a second voltage signal having a voltage level proportional to the duty cycle of said second pulses; and a differential amplifier having a first input terminal responsive to said first voltage signal and a second input terminal responsive to said second voltage signal to provide a differential output signal for application to the input of said variable frequency oscillator.

10. Apparatus as claimed in claim 9, wherein each of said first and second smoothing circuits comprises an identical resistor-capacitor network and a voltage dividing network connected to said resistor-capacitor network.

11. Apparatus as claimed in claim 10, wherein said variable resistance element is connected between said second smoothing circuit and the second input terminal of said differential amplifier and wherein the voltage dividing network of the first smoothing circuit comprises first and second fixed-value resistances connected in a series circuit, and the voltage dividing network of the second smoothing circuit comprises third and fourth fixed-value resistances connected in a series circuit between the associated resistor-capacitor network and said variable resistance element, the combined resistance of said first and second resistances having a value equal to the combined resistance of said third and fourth resistances and said variable resistance element.

12. Apparatus as claimed in claim 9, further comprising a comparator having a first input terminal responsive to said first voltage signal and a second input terminal responsive to said second voltage signal for generating a signal at one of first and second binary levels depending on whether said first voltage is above or below said second voltage respectively, and wherein said visual indicating means comprises first and second light-emitting elements respectively responsive to said signal at a first or second binary level.

13. Apparatus as claimed in claim 1, wherein said mixing circuit comprises:
   a frequency divider connected to said standard frequency signal source;
   a coincident gate having a first input terminal connected to said variable frequency signal source and a second input terminal connected to said frequency divider; and
   a monostable device having a first input terminal connected to the output of said coincident gate and a second input connected to said standard frequency signal source to generate a monostable pulse in response to each oscillation of the output of said coincident gate with a pulse duration variable as a function of the period of said standard frequency signal, said monostable pulse being said beat frequency signal.

14. Apparatus as claimed in claim 13, further comprising a frequency divider connected to the output of said monostable device for application of the frequency divided beat frequency signal to said visual indicating means.

15. Apparatus as claimed in claim 1, further comprising means for detecting the coincidence in frequency of said variable frequency signal and said standard frequency signal and means for visually indicating said coincidence.

* * * * *